Patented July 25, 1944

2,354,572

UNITED STATES PATENT OFFICE 2,354,572

PROCESS OF PRODUCING SURFACE COVERINGS CONTAINING OXYGEN-CONVERTIBLE SYNTHETIC RESINS

Theodore F. Bradley, Stamford, Conn., assignor to American Cyanamid Company, New York, N. Y., a corporation of Maine No Drawing. Application May 31, 1940, Serial No. 338,242

3 Claims. (Cl. 260—22)

This invention relates to an improvement in the manufacture of surface covering compositions such as floor covering compositions containing siccative binders which comprise a synthetic resin.

Previous attempts to produce floor coverings and the like utilizing synthetic resins have not been entirely successful. It has not generally been feasible to obtain materials which have the proper degree of flexibility, and yet which are sufficiently cured or "seasoned" to be suitable for the ordinary uses of such materials.

Prior to my invention it has been customary to mix an oxygen-convertible synthetic resin such as an unsaturated oil-modified alkyd resin with fillers, sheeting the mixture and then "seasoning" the sheeted material. Using this process, it is very difficult to obtain satisfactory sheeting and the products which are obtained are stiff and brittle after being "seasoned."

An object of my invention is to produce surface coverings which have sufficient flexibility, chemical resistance and hardness as to be satisfactory for the ordinary uses of such materials.

Another object of this invention is to provide compositions which may be sheeted easily to give homogeneous sheets which may be subjected to the ordinary handling without crumbling or breaking.

These and other objects are attained by oxidizing and/or polymerizing a siccative binder comprising an oxygen-convertible synthetic resin, mixing the resulting material with fillers, sheeting the mixture and "seasoning" the sheeted mixture. The distinguishing feature of my invention is the oxidation and/or polymerization step which precedes the admixture of fillers and other steps of the process.

The following example in which the proportions are in parts by weight is given by way of illustration and not in limitation.

Example

| | Parts |
|---|---|
| α-Pinene | 150 |
| Fumaric acid | 116 |
| Triethylene glycol | 150 |
| Linseed oil fatty acids | 157 |
| Glycerol | 18 |
| p-toluene sulfonic acid | 0.5 |

The terpene, fumaric acid and glycol are heated under reflux and preferably in an inert atmosphere in the presence of the p-toluene sulfonic acid as a catalyst. The apparatus in which the reaction is carried out preferably has a water trap through which the reflux condensate passes on its return to the reaction chamber. By this means, the water formed during the condensation is continuously separated and removed from the reactants and the reaction products. The condensation and esterification are continued until the acid number is less than about 10. The unreacted pinene is distilled off and the linseed oil fatty acids, together with the glycerol, are added to the resin. The reaction mixture is then maintained at about 200°–225° C. until an acid number of 8 or less is reached. The resin is then polymerized or bodied by blowing with air or oxygen at elevated temperatures, e. g. 50°–100° C., preferably in a "Wood and Bedford kettle." Any similar type of apparatus may be used, for example, one having the following description:

A cylindrical vessel is mounted with its axis horizontal and is provided with an agitator which comprises an axle placed along the axis of the cylindrical container and having radial blades or spokes attached thereto, each of which is disposed at a convenient angle, e. g. 45° C. to each of the adjacent blades. The axle is driven by any convenient means, but preferably by means of an electric motor provided with a reduction gear mechanism. The cylindrical container is provided with an air inlet, preferably at one end of the top of the container and an air outlet at the other end of the container. The cylindrical container is preferably enclosed in a jacket through which a heat exchange medium may be circulated. This heat exchange medium may be either a heating medium to raise the temperature at the beginning of the oxidation and/or polymerization or it may be a cooling medium in order to lower the temperature toward the end of the reaction when the temperature is likely to rise because of the exothermic reaction which is apparently involved. The apparatus is provided with a suitable means for charging and conveniently this may be done by having the entire top of the cylindrical container removable from the bottom part.

Initially the agitator speed is preferably about 300 R. P. M. The speed of the agitator is generally maintained at this point until the resin begins to become viscous. The speed is then gradually reduced as the resin oxidizes and/or polymerizes until a speed of about 100 R. P. M. is reached. The reduction in speed may be conveniently regulated if an electric motor be used to drive the agitator by keeping the power consumption nearly constant. Better results are obtained by this procedure than if a constant speed is maintained.

Prior to introducing the resin into the Wood and Bedford kettle, it is usually desirable to add a small proportion of a suitable drier such as cobalt naphthenate, lead naphthenate or mixtures of these or other oil soluble driers. The resin may be exposed to ultra-violet light during the oxidation and/or polymerization. The oxidation and/or polymerization is continued until the resin attains a viscosity which is suitable for use in the production of surface coverings.

The viscosity may be conveniently measured by placing a quarter of a gram sample between two flat glass plates about 4 inches square and subjecting to pressure between platens maintained at a temperature of 210°–215° C. for five minutes under a load of about 4.5 kilograms. The area over which the resin spreads is measured by a planimeter and this value is squared. The results are, therefore, expressed in units of (square inches)$^2$. Generally it is preferable that the resin have a viscosity of 0.5 (square inches)$^2$ according to the test just described. Compositions which are suitable for the production of satisfactory surface coverings should have a viscosity of 0.2–2 (square inches)$^2$ as determined by the method outlined. At this stage it is suitable for use as a binder for surface coverings. It is sometimes advantageous to allow the polymerized binder to age for from about three days to about three weeks before use. The apparatus for measuring the viscosity of the resin is described in detail in the application of Robert Bowling Barnes Serial No. 210,418 filed May 28, 1938.

The aforementioned application of Robert Bowling Barnes describes a method whereby after several viscosity measurements have been made at short intervals of time with the apparatus described therein and briefly set forth above, the values obtained (i. e. the squared values) are plotted as the mantissa and the time of processing as the abscissa. A smooth curve is obtained and, therefore, the time necessary to complete the oxidation and/or polymerization to any desired point may be obtained by extrapolation. The incorporation of this procedure in my process of producing surface covering compositions is obviously advantageous and it enables one to obtain accurate control of the processing of the compositions.

*Preparation of sheeted surface covering*

|  | Parts |
|---|---|
| Binder | 30 |
| Wood flour | 30 |
| Lithopone | 20 |
| Whiting | 20 |

These substances with or without a small proportion of drier, e. g. 0.1% of cobalt naphthenate, are mixed together, e. g. in an internal mixer. The compacted mass thus obtained may be disintegrated as by a set of "scratch rolls" which comprises a plurality of rolls having intermeshing teeth projecting from their surfaces. The resulting material is sheeted on calender rolls or optionally it may be further disintegrated and then calendered. The material may be calendered onto burlap or other fibrous backing if desired. The sheeted material is placed in a stoving oven through which a current of heated air at about 70° C.–90° C. is circulated until the material is completely "seasoned," i. e. until the sheet acquires the necessary degree of hardness.

The hardness may be measured by any of the methods employed in the manufacture of linoleum. See the Federal Stock Catalogue, section 4, Part 5, pp. LLL–L–351 et seq. and pp. LLL–L–361 et seq. for the method employed herein. The time required for "seasoning" a 2 mm. sheet of the composition described above is about twenty to thirty days. The resulting "seasoned" surface covering has an alkali resistance of about .28 mm. penetration. The alkali resistance may be determined by measuring the depth in mm. to which a 5% solution of sodium hydroxide penetrates in one hour at a temperature of 70° F.

Although I have found that resins of the type described above are particularly suitable in the production of floor coverings, various other synthetic resins may be substituted therefor, such as those produced by the reaction of diabasic acids such as fumaric, maleic, itaconic, sebacic, phthalic, adipic and succinic acids or acid anhydrides with a polyhydric alcohol such as glycerol, glycol, ethylene glycol, di-, tri-, tetra-, penta-, hexa-, octa-, dodeca-ethylene glycols, decamethylene 1,3-butylene glycol, α-propylene glycol, octadecandiol, etc. and suitably modified with drying oil fatty acids or, in some instances, with the drying oils themselves. Such resins may, of course, be modified in any of the known ways with monobasic acids and monohydric alcohols as desired. Generally I have found that resins made by the reaction of fumaric acid, triethylene glycol and a non-conjugated terpene hydrocarbon of the $C_{10}H_{16}$ series, e. g. α- and β- pinene, dipentene, limonene, and terpinene, are particularly suitable. Of these, superior resins are usually obtained with dipentene, α- and β- pinene. Obviously, mixtures of these may be employed, particularly such mixtures as may be obtained in the various commercial grades of terpenes which are obtained by fractional distillation. It is also possible to use the conjugated hydrocarbons of the $C_{10}H_{16}$ series, e. g. α- and β-phellandrene, α-terpinene, $\Delta^{3,8(9)}$ p-menthadiene, etc. Furthermore, maleic acid or maleic anhydride may be used in place of the fumaric acid, although superior results are obtained if fumaric acid be used. Among the drying oils or the acids derived therefrom which may be substituted for part or all of those used in the above example are included the following: menhaden, sardine or similar fish oils, tung oil, soyabean oil, perilla oil, oiticica oil, dehydrated castor oil, sunflower-seed oil, etc. Obviously various mixtures of the drying oils or mixtures of the drying oil acids may be substituted for the single drying oils or drying oil acids. Drying oil acids which have a relatively high iodine number and which are liquid at about 5° C. may be substituted for all or part of the drying oil fatty acids used in the above example. The term "drying oil" as used herein is intended to include not only all drying oils, but also the semi-drying oils. In some instances, it may be desirable to use mixtures of a drying oil and a fatty oil of the non-drying type.

Natural resins or gums, e. g. rosin, Kauri gum, Congo gum, ester gum, abietic acid its esters, pimaric acid, etc., may be admixed with the synthetic resin binders.

Other fillers may be substituted for part or all of that used in the above example, e. g. cork, alpha cellulose pulp, asbestos, cottonwood tree pulp, walnut shell meal, glass fibers, foliated glass, etc. Various pigments may be substituted for part or all of that used in the above example, e. g. lithopone, barytes, zinc oxide, titanium oxide, chromates, red lead, white lead, malachite green, chrome yellow, chrome green, Prussian blue, iron oxide, as well as various dyes, lakes, etc.

The term "seasoning" as applied to surface covering compositions indicates the process of curing by heating to polymerize and/or oxidize the composition to a stage wherein the surface covering is sufficiently hard and resistant to abrasion to be suitable for its intended purpose and yet is still sufficiently flexible to permit the usual bending and rolling required of surface covering material.

Obviously many modifications and variations in the processes and compositions described above may be made without departing from the spirit and scope of the invention as defined in the appended claims.

I claim:

1. A process of producing a surface covering composition which comprises heating with mechanical agitation in the presence of oxygen a siccative binder containing an oxygen-convertible alkyd resin until the binder becomes very viscous, mixing the viscous binder with filler, sheeting the resulting mixture and subjecting the sheeted mixture to polymerization conditions to effect the final hardening and cure.

2. A process as in claim 1 wherein the alkyd resin is obtained by the reaction of a terpene hydrocarbon of the $C_{16}H_{16}$ series, an alpha, beta unsaturated polycarboxylic acid and a polyhydric alcohol and modified with drying oil fatty acids.

3. A process as in claim 1 wherein the alkyd resin is obtained by the simultaneous reaction of alpha-pinene, fumaric acid and triethylene glycol and modified with linseed oil fatty acids.

THEODORE F. BRADLEY.